United States Patent [19]

Carolan et al.

[11] 3,995,328
[45] Dec. 7, 1976

[54] VACUUM TOILET SYSTEM

[75] Inventors: Raymond J. Carolan, Seattle; Bjorn R. Kristoffersen, Kirkland, both of Wash.

[73] Assignee: The Boeing Company, Seattle, Wash.

[22] Filed: Dec. 13, 1974

[21] Appl. No.: 532,569

[52] U.S. Cl. .................................. 4/10; 4/77; 4/79; 4/216; 210/167
[51] Int. Cl.² .................................. E03D 5/016
[58] Field of Search ............... 4/1, 10, 11, 12, 69, 4/76, 77, 78, 79, 80, 89, 90, 115, 216; 210/167, 152

[56] References Cited
UNITED STATES PATENTS

| | | | |
|---|---|---|---|
| 1,996,325 | 4/1935 | Cox | 4/10 |
| 2,749,558 | 6/1956 | Lemt | 4/10 |
| 3,034,131 | 5/1962 | Lemt | 4/10 |
| 3,064,274 | 11/1962 | Gleason | 4/216 |
| 3,329,974 | 7/1967 | Belasco et al. | 4/142 |
| 3,579,651 | 5/1971 | Russo | 4/10 |
| 3,733,617 | 5/1973 | Bennett | 4/10 |
| 3,751,735 | 8/1973 | Sargent | 4/10 |
| 3,855,641 | 12/1974 | Foster | 210/152 |
| 3,868,731 | 3/1971 | Stahl | 4/10 |
| 3,922,730 | 12/1975 | Kemper | 4/10 |

*Primary Examiner*—Harry N. Haroian
*Attorney, Agent, or Firm*—H. Gus Hartmann

[57] ABSTRACT

A vacuum flush waste diposal system for aircraft; wherein the required vacuum is acquired at altitude through the differential pressure between the aircraft cabin pressure and the ambient pressure above approximately 15,000 feet. When the aircraft is below this altitude or on the ground, the vacuum is provided by a blower. For flushing the toilet bowl, a timing device is initially actuated and functions: to introduce a recirculated flush fluid into a flush ring in the upper portion of the toilet bowl; and to open a drain in the lower portion of the toilet bowl, leading to the vacuum waste line; whereby, the waste and flush water are rapidly propelled through the waste line towards a centrally located holding tank, by the differential pressure acting upon it. Once in the holding tank, the waste fluid is filtered out for further use as the recirculated flush fluid.

The holding tank is positioned within the fuselage of the aircraft and has a vertically oriented filter screen separating the tank longitudinally into a fore and aft compartment, so that the acceleration forces of takeoff and the deceleration forces of braking upon landing causes the fluid to slosh fore and aft through the filter screen to aid in the filtration process.

The toilet bowl incorporates integral air slots around the periphery of the toilet bowl so that there is no possibility of inadvertant injury to the user that could be caused by the sudden application of vacuum pressure to a seated occupant.

29 Claims, 9 Drawing Figures

VACUUM TOILET SYSTEM

DESCRIPTION OF THE PRIOR ART

The use of vacuum pressure in municipal and domestic waste disposal systems is not of recent origin. The 1895 edition of Chambers Encyclopedia describes a pneumatic system where aerial suction was used in place of water. Of a more recent date, are the vacuum toilet systems built in Sweden by Liljenthal. The Liljenthal type toilet has a number of little pockets in the drain lines, so that the waste matter is moved only a short distance at a time every time that it is flushed. The waste matter may move a third of the distance to the waste holding tank and then stop and form another pocket; and then the next time it is flushed, it might move all the way into the tank. In this manner, the waste matter can be flushed up-hill over great distances; much more distance than the differential pressure in the system would indicate; because it moves so far and then it sits in a pocket, and then the next time it moves a little again. In a sense, the waste matter moves a step at a time.

However, with respect to airplanes, the recovery of sufficient liquid from the waste matter and recycling this as the flush water for cleaning the toilet bowl, in combination with a vacuum-powered transmitting system, has, to the inventors' knowledge, not been used. In the present invention, the filtration process and the entire method of recirculation, i.e., wherein the liquid from the waste matter is removed and then used as the flushing liquid, in combination with a vacuum-powered system, has been specifically developed for the high altitude passenger carrying airplane. Also specifically developed for the airplane, is the static filter unit in the waste holding tank.

SUMMARY OF THE INVENTION

The invention relates to a vacuum-flush toilet waste system for passenger carrying aircraft such as the Boeing 747, the Lockheed L1011, the McDonnell Douglas DC-10, and the other large passenger capacity aircraft; and, more particularly, to a vacuum-powered transmitting system in combination with a filtration process that recovers sufficient liquid from the waste matter so that the liquid can be recycled as the flushing fluid for cleaning the toilet bowl.

Sanitary installations on commercial aircraft have long represented an area where improvements have been sought, both by the aircraft manufacturers and the airline operators of commercial aircraft. Some of the reasons for this are the high degree of attention that the existing systems require and their relatively low level of reliability. From the airlines of users' point of view, the following points are of importance: the weight and cost should be low; the airplane interface should be simple, so as to permit a flexible floor plan; the facility should be as easy to move into and out of the airplane as a cargo container; and it should be self-contained and positively sealed to prevent leakage to aircraft structure with the resulting corrosion problems. Also, for all practical purposes, the toilet unit in the lavatory should be noticeably and functionally as close to home toilet use as possible in order that the user not be confused.

The vacuum-flush system of the present invention meets these objectives through the use of a recirculating system; and functions in a manner somewhat similar to commercial type toilets to the extent that fluid is used to wash down the waste matter in response to the operation of a flush valve.

The vacuum-flush system of the invention will handle any kind of waste and paper products that can be handled in the presently known commercial type toilets. But, like a home flushing toilet, it is not designed to be a "catch-all" for other types of refuse like: bottles, discarded clothing, bulky diapers, spray cans, etc.

The pneumatic vacuum-powered toilet flush system of the present invention utilizes a central waste collection tank at a remote location relative to the toilet units in order to provide a more sanitary and odor-free lavatory and the differential pressure at altitude for operation of the system. The advantage of the single, centrally and remotely located, waste collection tank is that no single toilet can be overfilled by excessive use; as is sometimes the case with existing self-contained capacity toilets. With a single tank of approximately 200 gallon capacity, for an aircraft like the Boeing 747, it would give a net usable capacity of at least 150 gallons and result in a favorable increase in net capacity; since, the present system has a total usable capacity of only approximately 120 gallons. Another advantage of the vacuum system of the present invention is that should a larger capacity or "over-size" tank be desired at a later date, to meet a change in passenger accommodations or for a special purpose such as the desire for less frequent servicing, it can easily be accomplished with a weight versus capacity, incrementall change, of approximately 1 pound for each 3 gallons of increase in capacity.

Because the drain lines of the present invention do not have to be positioned below the toilet bowl, or sloping downward toward the waste storage tank as with conventional home gravity drain systems, the waste storage tank can be positioned at any location with respect to the toilet bowl and still function properly. In fact, the drain lines could go uphill. However, from a safety and sanitary standpoint, it is desirable that the waste storage tank be remotely located and below the toilet bowl; because, there is an added element of safety should there be a leakage or breakdown in the system. It would not be desirable to have a backup of the waste material or leakage into the toilet compartment.

Another object of the invention is to permit the use of smaller diameter drain lines than the presently known four inch diameter drain lines which have to be installed with a continuous slope for draining the waste by the force of gravity. Employing a gravity drain method imposes severe structural restrictions on the location of both the lavatories and the drain lines within the interior of the aircraft; whereas, with the vacuum-powered transmitting system of the present invention, drain lines as small as 1½ inch to 2 inches in diameter, can be used. This simplifies the installation in an airplane and in addition, reduces the weight penalty. The vacuum-powered system provides flexibility in locating the toilet units within the interior of the airplane because there is no slope required in the drain lines. Also, one can eliminate the conventional waste water drain system, including drain masts, by connecting it to the vacuum system, if holding tank capacity permits. However, in order to make certain that all waste, like small bottles, etc., which enter into the tubing will pass through the drain lines, a 2 inch diameter tubing size is used for the main or trunk lines and then the diameter size is reduced to 1¾ inch for the branch lines which enter into the main drain lines; and with a further reduction in diameter size a 1½ inch for the opening at the bottom of the toilet bowl. This selection of graduated line sizes reduces the chance for clogging once the object has entered into the drain line tubing. However, in order to prevent long objects, that may be deposited into the toilet bowl, from clogging the drain lines at an inaccessible location, a sharp bend or trap is located right at the inlet to the main tubing run so that anything that passes this trap could complete the journey. Therefore, except for the object arresting bend or trap, the recommended bend or bend radii in the drain line tubing should be four times the diameter of the tube. Further, in order to prevent the buildup of waste material in the drain lines, the interior surface of the tubing, which is in contact with the waste material and also the interior of the toilet bowl, should be smooth and of a non-sticky material.

Another object of the invention is to provide positive venting or a vacuum breaker in the upper periphery of the toilet bowl that is designed to make it impossible for the user to pressure seal the toilet bowl even though the toilet seat is in the raised position and he has seated himself directly onto the toilet bowl. This positive venting of the toilet bowl is to prevent any possibility of injury to the user by the pneumatic vacuum force created by the flushing action, in the event that a person is seated on the toilet bowl without the use of the toilet seat which would normally provide such venting due to its spaced relationship with the upper surface of the bowl. There have been instances where in overly stout person has raised the toilet seat for the purpose of increasing the seating opening size, and seated himself directly onto the toilet bowl in sealing engagement therewith. Even with gravity flow waste flush system, the pressure differential is great enough to injure the person; but with the pneumatic vacuum flush system of the present invention, there is a much higher pressure differential force created and it is most imperative that the toilet bowl be positively vented.

One of the advantages of the vacuum pressure toilet system of the present invention, from an airline point of view, is that the ground servicing operation is simplified by having a single service location. In addition, no flushing or rinsing cycle is required. Only the remote holding tank is recharged with flushing fluid and this eliminates the danger of overfilling the toilets with priming liquid which has, in some instances, resulted in flooding of the airplane interior.

Another advantage of the vacuum toilet system is that it decreases the weight penalty of conventional gravity drain systems and in addition, provides cost savings by decreased maintenance expenses. An analysis comparison between the existing system on the Boeing 747 and the vacuum toilet system shows an estimated 30% weight savings over the present system and with fewer parts and less complexity than the existing system.

Another advantage is that due to the smaller diameter of the plumbing lines and the absence of control cables for each individual waste tank valve, the installation of the vacuum powered system is much simpler and will result in substantially less installed cost. Also, with respect to non-recurring costs associated with the vacuum powered system, if the development cost is amortized over 100 airplanes, the total cost per airplane system is less than that of the existing systems.

Another advantage is that it is possible to retrofit this system in existing airplanes with a minimum of technical effort and realize a substantial decrease in system weight and lower maintenance costs.

Another advantage is the possibility of using the system for the disposal of galley wastes, provided that grinders or some other means are used for breaking up the waste matter thrown into it.

Another advantage is that vacuum cleaner type outlets could be located throughout the interior of the airplane so that the vacuum power of the system could be used to clean the interior of the airplane or vacuum the rugs in a manner similar to a central vacuum cleaning system.

Further, it is contemplated that the waste matter at the collection tank could be neutralized, condensed and compacted into approximately five percent of its original volume. In this way, removal of the waste could take the form of just carrying out a sealed plastic bag and no raw sewage would ever have to be handled. Also, the removal time periods of the compacted waste residue could take place at intervals of weeks instead of daily as is presently done.

These, as well as other objects and advantages of the invention, will be more clearly understood from the following description when read with reference to the accompanying drawings.

DESCRIPTION OF THE PREFERRED EMBODIMENTS

Figure 1:
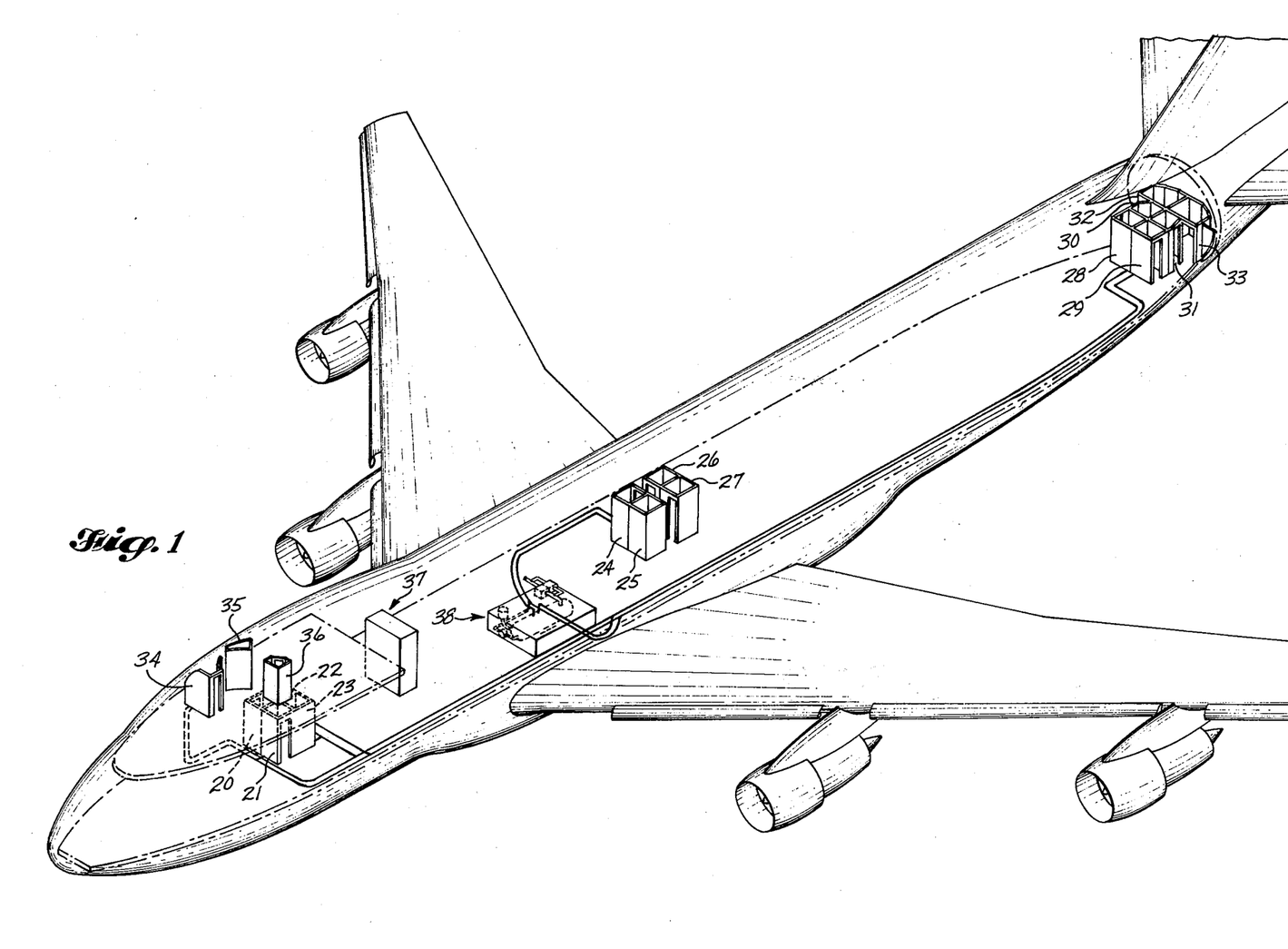
FIG. 1 is a perspective view of the preferred embodiment of the invention and depicts the layout of the vacuum powered waste disposal system as it can be installed in a Boeing 747 type airplane.
Figure 2:
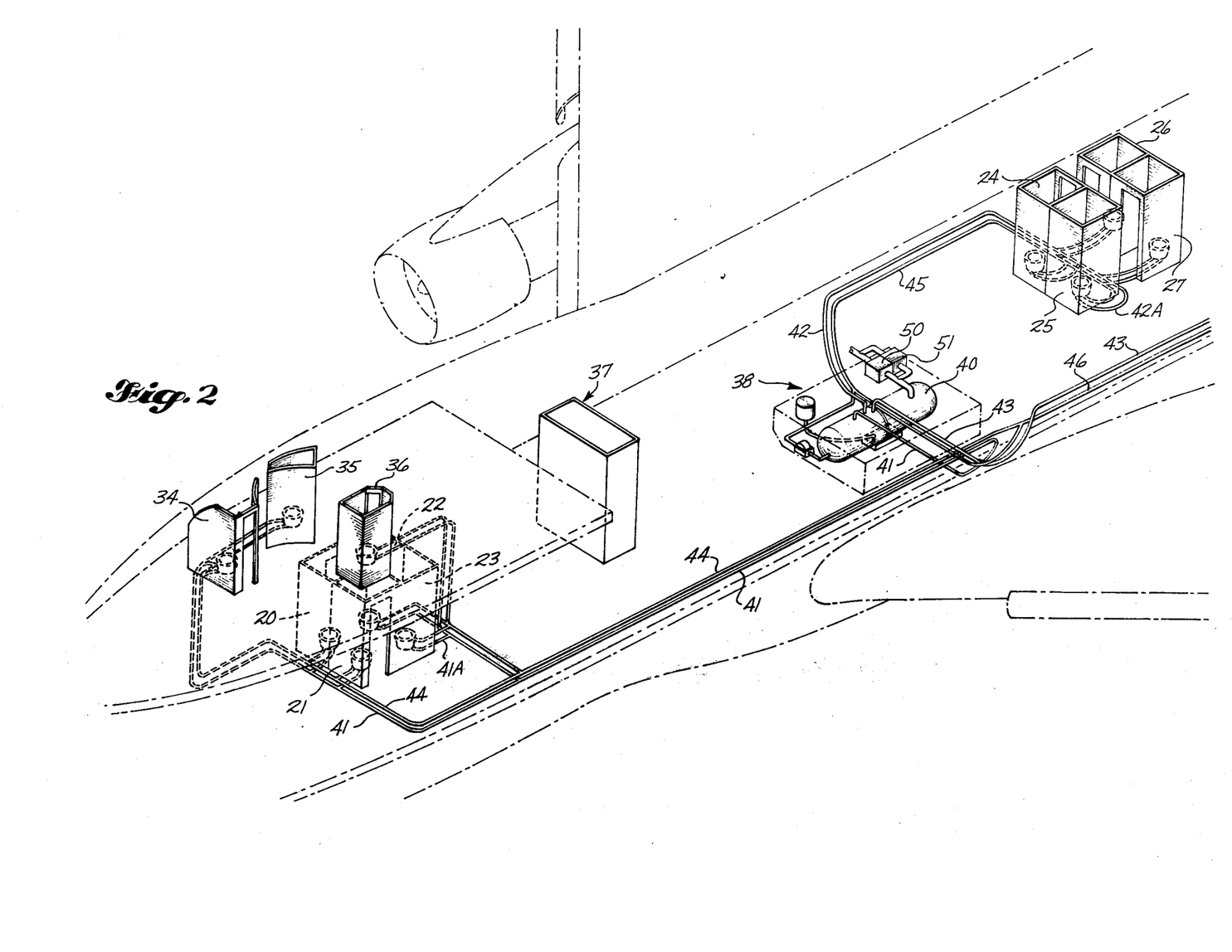
FIG. 2 is a perspective view similar to FIG. 1, but is enlarged to show the assemblies and components in more detail of the forward and mid-section of the fuselage.

FIG. 1 is a perspective view of the preferred embodiment of the invention and depicts the layout of the vacuum powered waste system as it can be installed in a Boeing 747 type airplane or as it might be installed in other large passenger carrying aircraft like the McDonnell Douglas DC-10 and the the Lockheed L1011; and FIG. 2 is an enlargement of the forward and mid-section of the fuselage shown in FIG. 1. With respect to FIGS. 1 and 2, 14 main deck lavatory locations 20 to 33 and three above the deck lavatory locations 34 to 36 are shown; and in addition, the galley 37 and vacuum tank storage area 38 are also indicated.

The system is a recirculating flush liquid type, that utilizes a nominal vacuum pressure of 6 to 8 PSIG, to move the waste matter from all of the toilets, wash basins, galleys and floor drains, to a single waste holding tank 40. For an aircraft the size of the Boeing 747, it would only be necessary to position one 200 gallon waste holding tank amidships; and as shown, the waste tank 40 is located in an unpressurized area 38 in the mid-section of the fuselage, which is below and outside of the pressurized shell of the passenger compartment, and inside of the body fairing of the fuselage; preferably in a dry area. As shown, this is a good location relative to the airplane's center of gravity; and is also central to the lavatory complexes. With the waste holding tank 40 being positioned below the passenger compartment, it permits a portion of the lavatory complex to operate as a gravity drain system, in the event of a vacuum failure; and with the waste tank 40 outside of the pressure shell, any back flow of odors through the drain valves is prevented since the normal flow path for tank leakage, overflow, and odors, will be out of the airplane rather than into it.

Figure 3:
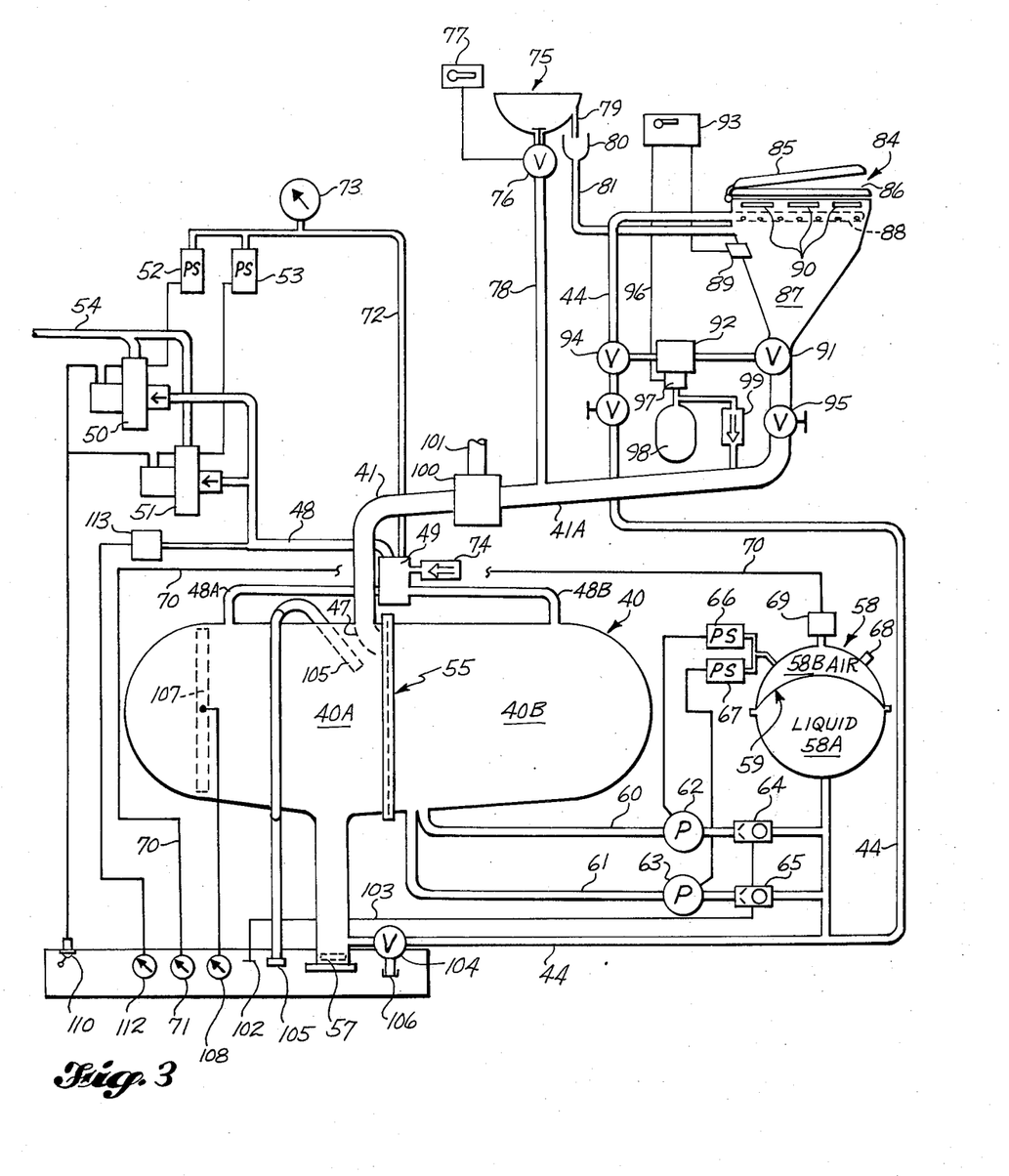
FIG. 3 shows in schematic form the preferred embodiment of the vacuum powered waste disposal system.

The system, as shown, has three main drain lines 41 to 43 coming into the waste tank 40; and three main flush fluid lines 44 to 46. Each of the main drain lines and main flush lines comes from a cluster of toilets. Therefore, in the event of a blockage, only one of the clusters of toilets would become inoperative, i.e., those that were connected to that particular main line. No matter how a system is designed and built, sometimes things go wrong, such as a clog-up or a rupture in the line, and it is certainly desirable that these events and their consequences be limited. Since a rupture is more rare than the possibility of a clog-up, the system is designed such that a basic or initial restriction is located right in or at the base of the toilet fixture such that if a solid object is small enough to go through the initial restriction then it should go all the way into the waste tank 40. There is a little step-up in pipe size, i.e., the diameter of the drain lines increases slightly as the waste material feeds through the system, in order to make certain that a jam isn't caused as would occur if there were a step-down arrangement.

The minimum diameter of the vacuum drain lines 41 to 43 could be smaller than 2 inches; but, on a public use system like an airplane, where there is very little control over the public's abuse of it, and it would not be desirable to go any smaller than the nominal 2 inch diameter. In the home or on a private boat, the vacuum drain system could be operative with as little as ¾ inch pipe size. If certain precautions were taken, e.g., the present type of big lofty paper seat cover could not be used; a special type of paper seat cover would have to be used; and it would have to be made certain that feminine sanitary napkins were not deposited.

The nominal 2 inch diameter drain size will handle all of the common paper covers and waste that is normally deposited in a commercial or public toilet system. Some of the things that may find their way into toilets are cosmetic bottles or alcoholic beverage bottles used on airplanes. Rather than throwing them into the trash can, they are thrown into the toilet. One of the reasons for this may be that the present day toilets on airplanes have a large opening at the bottom of the toilet bowl which appears as if it will handle the size of the discarded object. However, even the 2 inch diameter size will not serve as a waste basket. Therefore, the bottom of the toilet bowl is designed such as to give the visual impression that the opening size will only pass normal toilet waste matter which will discourage anyone from trying to get rid of large objects by dropping them into the toilet. The actual size of the opening is designed to be hidden, such that it appears rather small but when the flush valve is operated the opening is made larger. Also, a restriction is made at the base of the toilet bowl so that objects too large to pass through the 2 inch diameter size drain line will be stopped and can be fished out instead of going into the line and cause a blockage at some junction. Further, the restriction has a bend in it so that long thin objects like a pencil are likewise stopped and fished out before they cause a blockage in the line. The drain system is designed such that whatever does go through the restriction, will be conducted all the way into the tank.

One of the differences between the drain lines of the present invention and other lines, is the pipe size. In the vacuum drain system, it is possible to use only a ½ inch flush liquid supply line and a two inch waste drain line, which is much smaller than the four inch diameter drain lines of the gravity type drain system. This makes it much easier to initially install the vacuum-powered drain system or to have the lines brought to a new location since it permits the lines to be routed much more freely within the floor space of the airplane. Further, the vacuum drain lines do not require a constant down slope as with the gravity system, which makes the system much easier to install. The smaller diameter lines with no required down slope make it possible for the airplane manufacturer to accommodate each of the airline customer's desires; and makes it practical for each airline to arrange its galley and lavatory facilities as the need and usage dictate.

The equipment located in area 38 of the fuselage shown in FIGS. 1 and 2, also includes a pair of vacuum pumps or blowers 50, 51, which, as shown in FIG. 3, are connected in parallel to the storage tank 40 through an interconnecting tank ventilation line 48, a water separator 49 having a negative pressure relief valve 74, and branch lines 48A and 48B. A vacuum pressure bleed line, from the tank ventilation line 48, is connected to a vacuum pressure transducer 113 and vacuum pressure gage 112. The water separator 49 comprises a plenum chamber that functions to prevent liquid droplets from leaving with the airstream in the overboard vacuum vent line 54. The vacuum blower system further comprises: a vacuum blower switch 110; a pair of pressure switches 52, 53; and a pressure gage 73 connected through line 72 to the water separator 49. The vacuum blower system maintains approximately 6 to 8 PSIG vacuum pressure in the system when the aircraft is below the minimum altitude of approximately 15,000 feet or on the ground. In flight, above 15,000 feet, vacuum pressure is maintained by venting the waste tank 40 to the outside ambient air, and controlling the effect of cabin air pressure by a variable orifice.

Assuming that the airplane has been at its cruise altitude above 30,000 feet and the toilet waste disposal system has been operating on the vacuum pressure differential produced by venting the system to ambient air through overboard vent line 54, shown in FIG. 3, and now the airplane is starting to descend. At the descent altitude of approximately 15,000 feet the vacuum pumps 50, 51 are made to cut in automatically by pressure switches 52, 53, shown in FIG. 3, and the vacuum pressure in the tank 40 is then supplemented by the vacuum pumps. When the airplane is below this altitude, or when the pressure differential is less than a predetermined amount, the vacuum pumps are put into operation. The vacuum pressure in the tank is directly sensed and is maintained at a predetermined amount. An altimeter or barometric pressure type instrument could also be used for operating the vacuum pumps. For economy, the vacuum pumps are designed and sized so that they produce an acceptable minimum level of vacuum pressure throughout the system. Therefore, even if the vacuum pumps remain in operation at cruise altitude, the system would not detrimentally exceed its vacuum pressure design level.

Also, in the unpressurized area 38 of the fuselage in FIGS. 1 and 2, the waste holding tank 40 and its associated equipment can be expected to be subjected to a wide range of ambient air temperatures, i.e., approximately minus 70° to plus 100° F; and a good thermal design of the equipment is necessary to avoid freezing. It may be that the piping of the waste disposal system could run into areas of the airplane where it is cold or from a space requirement standpoint, it may be that the best location for the waste holding tank is outside the pressure hull of the airplane; where, at cruise altitudes, the ambient air temperature can drop to minus 65° F. This is so low, that provisions have to be made to keep the lines from freezing up. Also, there is some evaporative cooling inside of the waste holding tank, that tends to further cool the waste matter. Therefore, to contend with these low temperatures at altitude: electrical heating tape is wrapped around the lines; the waste holding tank is insulated and wrapped with heating blankets; and the equipment has insulation installed around it as required. The present airplanes have heating tapes, blankets, and heating units installed around the equipment, including the water distribution system, in order to apply heat locally where the temperature drops below a certain predetermined level for maintaining their equipment at operating temperature; and the amount of heat necessary is established by calculation and tests.

It is recommended that the waste tank 40 be of a glass fiber filament wound type, with foam insulation in-between the inner layer or bladder, and the outer wrappings. Since the advantage of this construction is that it is of light weight, rigid, resistant to chemicals, and has good thermal properties; thereby, minimizing the need for protective heating. The connecting lines could be made from filament wound glass fiber, titanium, or stainless steel as is generally used on present known installations. However, the metal materials may require protection against freezing in some areas.

FIG. 3 shows in schematic form the preferred embodiment of the vacuum-powered toilet waste system of the present invention. The elongated waste holding tank 40 is positioned such that it is lengthwide and approximately parallel to the longitudinal axis of the airplane; and a low point or sump is provided by sloping the bottom surface from each end of the tank towards a low point in the longitudinal center of the tank. The waste tank 40 has a transversely oriented filter screen 55 which separates the tank into a forward compartment 40A and an aft compartment 40B to separate the solid waste particles from the filtered liquid. The waste matter from the toilet drain system enters at the top of the tank through one of the main drain lines e.g. 41, against the deflector 47 and into the waste tank compartment 40A. The deflector 47 for the incoming waste functions to utilize the impinging force flow of the incoming waste to wash along the filter 55 and prevent it from clogging up. The liquid portion of the incoming waste filters through the wire mesh screen filter 55 into compartment 40B, and from there it is utilized as the flush liquid. The positioning of the tank and its filter element are such that the acceleration forces of take-off and the deceleration forces of landing and braking, as well as the in-flight pitch attitude changes, causes the waste matter to slosh fore and aft through the filter screen 55 and thereby aids in the filtration process. Although, the tank could be positioned laterally with respect to the longitudinal axis of the airplane; however, the turns or lateral movements of the airplane are generally made with a positive 1 g. centralized force or as generally sensed by a seated passenger, a constant seat pressure; and this would induce very little if any slosh motion to the waste fluid.

The tank is mounted within the fuselage such that the waste receiving compartment 40A and the filtered liquid compartment 40B are aligned longitudinally with respect to the fuselage of the aircraft; and the longitudinal axis of the tank is aligned horizontally, approximately parallel to the longitudinal axis of the fuselage, such that when the aircraft is at a relatively high angle of attack as at take-off and during climb-out, the truck axis is likewise horizontally inclined and the liquid level in the waste receiving compartment 40A is momentarily above that in the filtered liquid compartment so that the liquid in the forwardly positioned waste receiving compartment 40A seeps through the filter separator 55 and into the aft compartment 40B due to the difference in liquid head.

Generally, in the filtration process for reclaiming liquid from the mass of paper and human waste, the paper is one of the biggest problems. It is the most difficult thing to cope with because when it gets wet, it disintegrates and reverts to pulp; and in so doing, makes very small particles that will pass through even a fine filter. It clogs up the filter elements; and lodges in cracks and crevices, where it starts decomposing and causing an ordor.

The glass fiber filament wound tank has been in use in aircraft for toilet systems, and some of them have filter units in them. These tanks have generally had a small pump filter unit that was incorporated within a recirculating gravity type toilet tank system; and wherein, the small pump filter unit was submerged into the waste matter. Every time the toilet was operated through a flush cycle, the pump started up and drew through the small filter unit, comprising a scraper and basket, a large quantity of flushing fluid in a short duration of time. Also, some of the aircraft manufacturers have moved the waste holding tank portion of their recirculating gravity type toilet tank units below the floor level; and in some instances, have the toilet portion draining into a single large waste holding tank situated below the floor level; wherein, one or more filter pump units are submerged into the waste matter in the holding tank. The known pump filter assemblies for the recirculating gravity type toilet tank units basically comprise a number of disks with scrapers in-between. The disks are spaced apart approximately five hundredths of an inch or so and the scrapers in-between, keep cross-pockets from being drawn into it.

However, there is a problem with cloth and plastic materials getting in between the disks and scrapers, and jamming the filter assemblies. In addition, they don't provide the degree of filtration desired for a vacuum waste disposal system as the present invention, for getting the recirculating flush liquid clean. Further, the known pump filter assemblies are started up and operated on demand; whereas, in the present invention, the filter unit is in constant use and of the static type, which produces a much finer filtration.

In general, the filtering element 55 used in this invention is of the small mesh type that looks somewhat like a household fly screen. The filter screen should be of approximately 20 mesh (20 openings per inch) with at least 50% free opening area i.e., the wire gage size of the screen should be limited such that at least 50% of the screen area be free opening and not obstructed by the thickness of the wire. The approximate 20 mesh screen element must be sufficiently backed up structually by a strong grid on both sides thereof, in order to support the waste slosh loads imposed thereon. The required screen filter area is approximately 2.5 square inches for each gallon of storage tank capacity. The filter 55 is different from the type of filter generally in use in the waste systems of passenger carrying commercial airplanes, in that it does not have scraper blades or similar means for removing entrapped sludge that accumulates against the screen mesh; and no large volume of fluid flows through the filtering element 55, as with those of the prior art, during a short period of time. Instead, the filter assembly 55 of this invention, is a trickle type that allows the fluid to trickle through it. The fluid becomes relatively clear of particles because of the fine mesh screen element that retains the paper particles or pulp. The retained paper particles build up against the interior wall surface of the fine mesh screen element and produces a sort of filter cake of the paper itself that aids in the filtration process i.e., the screen provides a matrix for the disintegrated paper and forms a filter cake that actually aids in the filtration process. Whatever small amount of paper that does get through is of such small particle size that it goes through the system with the reclaimed fluid without clogging up the valves in the system; and returns with the human waste and flush water again. Therefore, it is a self-cleaning type of process. Also, during the draining operation, the filter element 55 will be cleaned through a back-flushing operation; wherein, the filtered fluid in waste tank compartment 40B upon removal of a drain plug 57 or actuation of a dump valve in waste tank compartment 40A, will flow back through the screen mesh 55 dislodging the entrapped particles and wash it clear.

The shape of the filter assembly 55 will depend in large part upon the particular installation and the physical space available for the storage tank 40. However, at least half of the volume of the storage tank 40 should be on the unfiltered side 40B of the fine screen filter element because any waste matter that does not dissolve completely will have to remain within the unfiltered compartment 40A until the storage tank 40 has been drained out; and the remaining storage tank volume would be for the basically clean fluid that has been filtered. In addition to the central waste holding tank 40, there is another smaller tank or accumulator tank 58 which takes some of the filtered liquid that has passed through the static filter unit 55 into the flush liquid chamber 58A, and retains it under pressure for the next flush cycle.

The accumulator 58 comprises: a bladder or diaphragm 59 separating it into a liquid compartment 58A and an air compartment 58b; an air valve 68 through which the air compartment 58B is pressurized and a pressure transducer 69 which transmits the accumulator pressure from air chamber 58B, through line 70, to a pressure read-out gage 71. The pumps 62, 63 are actuated by the pressure switches 66, 67 and operate only on demand to fill the flush liquid chamber 58A of accumulator tank 58.

The filtered liquid from waste tank compartment 40B is withdrawn from the tank sump through a pair of parallel lines 60, 61 by impeller pumps 62, 63 through check valves 64, 65 and into the accumulator tank 58. By positioning the outlets of the lines 60 and 61, at the bottom of the tank or tank sump, any solids passing through the filter 55 will be withdrawn and recirculated back to the waste receiving side of the filter for refiltration, thereby preventing build-up of sediments and paper mache from the tiny pulp particles, in the filtered liquid compartment 40B. If this is not done, i.e., if sedimentation is allowed, as in some designs, the system would become inoperative after a period of usage. For example, of the outlets for withdrawing the filtered liquid were moved to a higher location on the tank compartment 40B, the sediments including the paper mache, would build up from the bottom of the compartment gradually decrease the flush liquid storage capacity. Also, this sediment would break up and chunks would become loose and be drawn into the flush system where it would clog the pumps, valves, spray ring, etc., and eventually make the system inoperative.

When the pressure switches 66 and 67 sense low pressure in air chamber 58B due to the flush liquid chamber 58A being emptied, they actuate the pumps 62, 63 to refill the accumulator tank chamber 58A where it is retained under a pressure of approximately 30 to 45 PSIG until it is used for flushing.

The schematic of FIG. 3 as an optional feature shows the wash basin 75 having a drain valve 76 connected to a trip handle springloaded shut 77 and drain pipe 78. The wash basin overflow enters line 79 and passes through a vacuum braker 80; and from there, through line 81 to enter into the toilet fixture 84. The wash basin drain valve 76 when operated by trip handle 77, directs the wash basin water through line 78 to enter a branch line 41A of the main drain line 41. The toilet fixture 84 which is generally covered by a decorative shroud, comprises: a lid 85, a seat 86, a bowl 87, a spray mechanism or ring 88, flush valve 91, vacuum control valve 97 and actuator 92, trip handle and timer mechanism 93, and flush fluid valve 94.

The flush fluid valve 94, flush drain valve 91, actuator 92, and the toilet flush timer mechanism 93 should all be vacuum and/or electrically controlled and powered. To determine whether enough vacuum pressure would be available just downstream of the flush drain valve 91 the flushing operation, test readings were made approximately six inches below this valve, and it was found that the vacuum pressure decayed too rapidly to function for this purpose. Therefore, it was necessary to provide auxiliary means, such as to vacuum pressure charge a tank 98 between the flush cycles for the vacuum reservoir and to draw on this energy for operation of the mechanical components.

The bowl overflow sensor 89 will put a signal through the timer 93 to the vacuum control valve 97 and actuator 92 causing this to automatically open valve 91 for 3 seconds to prevent liquid from overflowing the bowl.

A continuous ventilation (not shown) of the air around the toilet bowl is provided to make certain that any odors at the toilet or within the lavatory compartment are removed and vented to the outside of the airplane. The vacuum waste drain line 41A, from the flush drain valve 91 below the toilet bowl, runs through a shut-off valve 95 and into the top of the central waste collection tank 40, where it is directed by deflector 47 against the filter 55 to wash it and prevent it from clogging up.

An automatic valve 100 is installed between the branch drain lines 41A, 42A, 43A from the individual lavatory unit drains and their connections to one of the 2 inch diameter main or trunk drain lines 41, 42, 43. This automatic valve 100 will open only when there is liquid present in floor drain branch line 101 to be drained; and is also required to prevent too great a load on the vacuum pressure of the system, such as would occur with a large number of open drains. This automatic valve 100 also prevents any back flow of odors through the floor drains connected to line 101, when the system is shut down or when on the ground. As depicted, the automatic drain valve 100 could serve as a junction for the connection, as through line 101, of additional individual lavatory units.

The main drain lines 41, 42, 43 are brought into the top of the waste holding tank 40 instead of at the bottom in order to prevent backflow into the lines when the aircraft attitude is such as to position the holding tank above the toilet bowls, and to prevent sediments at the bottom of the tank from clogging the inlet. The central waste collection tank 40 serves two functions: as the storage receptical for the waste from the toilets and galley 37; and as a vacuum pressure accumulator for the differential pressure flow, required to move the waste matter through the drain lines. It may be desirable to add an additional vacuum pressure accumulator into the system for those occasions where the waste holding tank is nearing its full capacity.

The operation of the vacuum-powered toilet flush system is as follows: After waste matter is deposited into the toilet bowl 87, the flush cycle is activated by depressing the toilet flush lever 93, which actuates a timing mechanism. This timing mechanism is connected through line 96 to vacuum control valve 97 for controlling the flush valve actuator 92. The flush valve actuator 92 is vacuum powered by a vacuum reservoir tank 98 which bleeds vacuum pressure from main vacuum drain line 41A, through check valve 99. The flush valve actuator 92, when actuated by the toilet flush lever 93, opens up both the flush drain valve 91 at the base of the toilet bowl and the flush liquid valve 94; thereby releasing recirculated flush liquid out through the spray ring 88 into the upper section of the toilet bowl 87 to cleanse the toilet bowl. Approximately one quart of flush liquid is directed down the toilet bowl through the spray ring 88, such that the sides are kept clean and the paper seat cover and other paper is moved to the bottom of the toilet bowl, where it will be caught in the air stream and flushed away. The waste matter and flush liquid are removed from the toilet bowl by the vacuum pressure applied through the flush drain valve 91 and directed into the branch drain line 41A and main drain line 41, from which it enters into the central collection tank.

The flush liquid valve 94 and the toilet waste valve or flush drain valve 91, are linked or coupled together so that when the flush lever 93 is tripped, both of these valves open up: one to allow outflow of the waste matter; and the other to let in the flushing or cleaning liquid. The valves 91 and 94 will remain open for the approximate 3 second duration of the cycle. The duration of the flush cycle can be changed by adjusting the timer 93.

Operation of the system is not dependent upon the use of a liquid. It should be noted that the unit will function almost equally well if no liquid were used during the flush cycle, as the pressurized cabin air alone, will direct paper to the bottom of the bowl; and the waste matter could still be removed from the toilet bowl and moved through the waste lines to the holding tank 40 by the air flow alone. However, the liquid is necessary to make the system sanitary; because, it is utilized for washing down the toilet bowl to remove any smearing substance that might otherwise cling to the sides and be left in the toilet bowl, causing odors. In addition, the liquid aids in depressing and compacting the waste matter. The flushing action or flow of the liquid from the toilet bowl through the drain lines also aids in the efficiency of waste removal, by slightly inducing a suction effect in the tubing, in a manner similar to that induced in a gravity feed system. The bowl interior should be smooth and with as non-sticky a surface as possible.

The main purpose in producing a vacuum is to be able to remove the waste matter from each of the toilet compartments and transport it through the drain lines to a central holding tank where it can be processed and simplify the servicing of the airplane. During flight at altitudes above 15,000 feet, there is sufficient differential pressure between the aircraft cabin pressure and ambient, to provide a pneumatic vacuum source of infinite capacity, when the central waste collection tank 40 is vented through overboard vent line 54, to the outside or ambient atmosphere. Therefore, there is no problem in the number of toilets that are simultaneously flushed. However, when the aircraft is below this altitude or on the ground, where this pressure differential is to be supplied by a blower system, a pneumatic vacuum reservoir is required to provide the capacity for normal operation of the system, or the capacity of the storage tank should be large enough to provide the vacuum capacity.

The vacuum pumps 50, 51 are put into operation when the pressure in the tank 40 drops below a predetermined value. In flight, the pressure differential between the inside and the outside of the airplane is sufficient to prevent the vacuum pumps from operating.

The vacuum flush cycle is operative anywhere from a 6 psi pressure differential to the maximum that is available, which is about 7 to 9 psi. For the Boeing 747 above 35,000 feet altitude, the maximum pressure differential is approximately 8.9 psi. This amount of pressure differential available is as a result of the altitude at which the aircraft is flying, in combination with the degree of cabin pressurization. When the airplane is on the ground or below an altitude giving a pressure differential of less than 6 psi, a forced flow has to be produced by a pump; and since the system is operative at a 6 psi pressure differential, it would only be necessary for the pumps to supply this amount.

The system is designed such that it is capable of handling a great many of those unexpected things that happen i.e., in the event that every one of the individual lavatory units, which are dispersed throughout the aircraft, were to be operated through their flush cycle, not in a sequential manner, but at the same time, there would be no damage done to the system. However, the result will be that a much greater than normal pressure drop will take place across each of the individual toilet units. If the waste matter were to move as a neat plug through the lines, there would hardly be any effect on the vacuum pressure; since it would just be the volume of air in the tube that would be displaced. However, that is not the manner in which the system generally functions. Actually, the waste matter often strings out and a lot of air blows by the waste, which drops the pressure; and if there are too many of the lines open at the same time, the flow of the waste could stop. Therefore, the system is basically restricted by the usage as opposed to number of lines going into the tank. Although it is quite remote that every toilet unit would be flushed at the same time; it could happen, which would cause less efficiency in the flow of the waste matter and could prevent the waste from reaching the tank during the flush cycle. A simple, computed simulation program was written on the probability of simultaneously flushing, using "Poisson" distribution.

The program accepted input for:
$n$ = number of toilets (13)
$T$ = occupancy time (180–300 sec.)
$TF$ = flush time (5 sec.)

The program picked random numbers in the range of the occupancy time. One computer experiment was to check into the system at any given time and register activity of that moment. One hundred thousand experiments were carried out, assuming that all toilets were being occupied, with one flush per usage cycle.

Result:

| 0 | units flushed | 70.500% |
|---|---|---|
| 1 | unit flushed | 24.900% |
| 2 | units flushed | 4.180% |
| 3 | units flushed | 0.400% |
| 4 | units flushed | 0.003% |
| 5 | units flushed | 0.000% |

The waste matter doesn't have to move the entire distance to the holding tank 40 during one flush cycle. Generally, the waste matter will flow rapidly enough through the lines so that it will move the entire distance from the toilet bowl 87 into the holding tank 40 during one flush cycle. The waste matter continues to move in the line after the flush valve 91 has closed, due to the differential pressure between that section of the line downstream of the waste matter and that section of higher pressure spectrum thereof until the pressure in the waste line and the holding tank has become equalized. However, if it doesn't, there is no harm done if the waste matter stops in the line or moves intermittently through the line, since it will eventually wind up into the tank. Normally, the next flush cycle will then push it the remainder of the distance to the tank.

Figure 4:
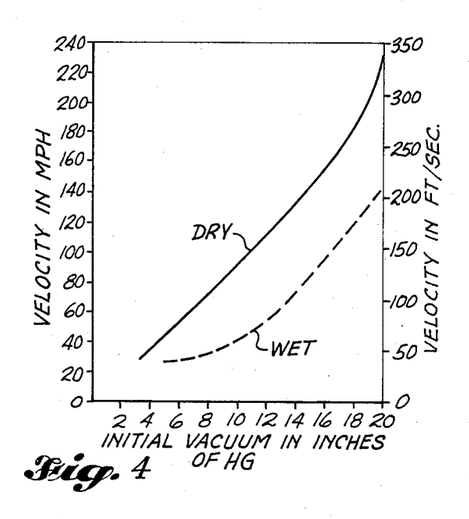
FIG. 4 is a graphic plot of waste velocity vs. the value of the initial vacuum in the waste holding tank.

FIG. 4 graphically illustrates for a given set-up, the correlation between the initial vacuum tank pressures in inches of HG, and the flow velocity in ft/sec. The waste material consisted of: four feet of toilet tissue, a twelve inch dog food extrusion, one paper seat cover, and one paper towel. The flush time was determined from the time that it took to empty the bowl, and to transfer the waste material through the lines to the holding tank. This was a function of the pressure differential between the inside of the collection tank and the toilet compartment; and a further determining factor, was the quantity and consistency of the waste material. As can be seen, it varied between 353 ft/sec for the dry matter at 20 inch HG vacuum to 40.5 ft/sec for wet matter at five inches HG vacuum. The wet matter at 10 inches HG vacuum, attained a velocity of 61 ft/sec half of which is considered satisfactory for design purposes. In flight, the pressure differential will be greater, which is good. For example, assuming that the longest tube run is 120 feet, the time required to clear the tube should be less than the flush cycle. Using a pinch-type flush valve, the following criteria should therefore apply for design purposes: closed to open — 1 second; stay open — 1 second; open to close — 1 second; total time of valve cycle — 3 seconds. Most of the acceleration of the waste material in the tube takes place almost at once and the speed is almost constant for the remainder of the distance to the holding tank. As previously stated, the waste matter does not necessarily have to move the entire distance to the waste holding tank during one flush cycle; but can be moved to the waste tank by a series of flush cycles.

Figure 5:
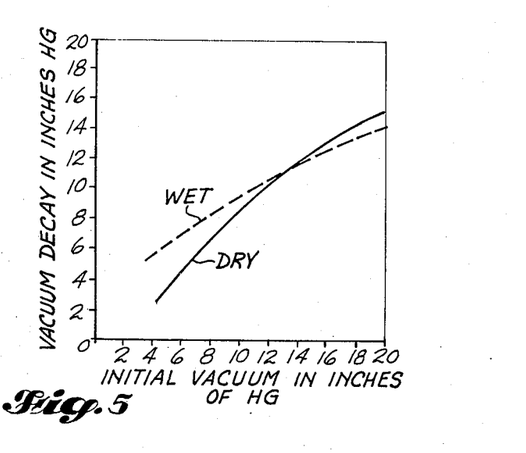
FIG. 5 is a graphic plot of the vacuum decay in the waste holding tank vs. the initial vacuum for a typical flush cycle.

FIG. 5 illustrates graphically for the same given set-up, the decay rate in the vacuum pressure of the holding tank, during the dry and wet matter flush tests, as plotted against the initial vacuum pressure in the holding tank before each flush operation. The remaining vacuum pressure in the holding tank is therefore the differential between these two values. For example, to find the remaining vacuum pressure in the holding tank after each flush, subtract the decay from the initial (i.e., initial, 10 inches HG; decay, 8.7 inches HG; remaining vacuum pressure, 1.3 inch HG). In comparison with the dry matter flush tests, the decay rate in the vacuum pressure during the wet matter flush tests is much less due to the sealing of the water in the lines. For example, for the wet matter at 10 inches HG initial pressure, the decay is only 4.8 inches HG and the remaining vacuum pressure is 5.2 inches HG; whereas, for the dry matter at 10 inches HG initial pressure, the decay is 8.7 inches HG and the remaining vacuum pressure is 1.3 inches HG. A high capacity, high pressure differential pump is required for maintaining the required vacuum pressure inside the collection or holding tank while the aircraft is on the ground or at low altitudes. For design purposes, to establish the decay rate of vacuum pressure during the flushing operation, a pressure transducer can be utilized and installed in the holding tank. The air consumption during testing using a 100 gallon tank was approximately $(100 \times 8.7) / (7.5 \times 29.92) = 3.86$ scf (standard cubic feet) of air for a flush valve opening of 1.5 seconds For a full three second flush cycle, where the opening takes 1 second and the closing takes 1 second, approximately 5 scf of air will be required. In estimating the pump capacity required for a passenger aircraft the size of the Boeing 747, having a complement of 16 toilets, and assuming that a toilet will be flushed every three minutes would therefore give an average of $(3 \times 60)/16 = 11$ seconds between flushes. To cover the total consumption of air, the blower must therefore be able to supply the following: flushing $(5 \times 60)/11 = 27$ scfm (standard cubic feet per minute), plus a reasonable allowance for leakage of approximately 7 scfm. The total pump capacity required is therefore 34 scfm. A pump of this capacity should therefore be able to maintain a vacuum pressure differential of 10 inches HG.

Figure 6:
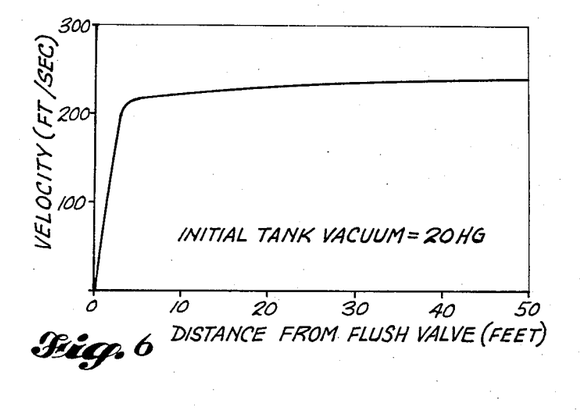
FIG. 6 is a graphic plot of the velocity of a waste load vs. the distance from the flush valve.

FIG. 6 graphically illustrates for the given set-up, the acceleration test of wet matter to determine the acceleration rate of wet matter from a static condition at the flush drain valve 86 to its entry into the waste holding tank 40 positioned approximately sixty feet from the toilet bowl. The test results established that the wet waste matter obtains 82% of its average velocity within three feet of the flush drain valve 91.

Figure 7:
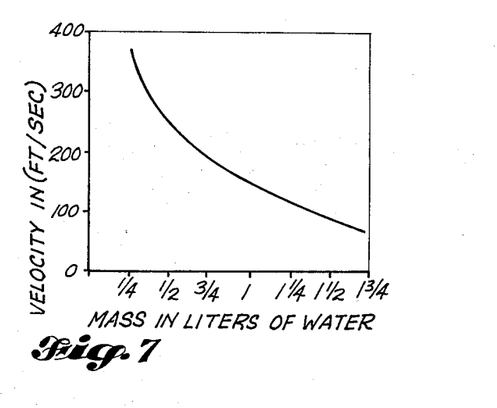
FIG. 7 is a graphic plot of the velocity of a quantity of waste vs. the volume of waste.

FIG. 7 graphically illustrates for the same given set-up the effect that a varying amount of matter has on the flow velocity when the pressure is kept constant. (In the illustration of FIG. 4, the amount of waste material used was considered to represent an average value.) The conditions of the mass versus velocity graph in FIG. 7 were: 15 inches HG vacuum initially in the holding tank; and varied amounts of water during the flush operation wherein the water was poured directly into the bowl prior to flushing. As expected, the transfer time is increased, with an increase in mass; however, the total time of a 3 second valve cycle for a maximum tube run of 120 feet, as established in the preceding FIG. 4, is a realistic value for design purposes.

Figure 8:
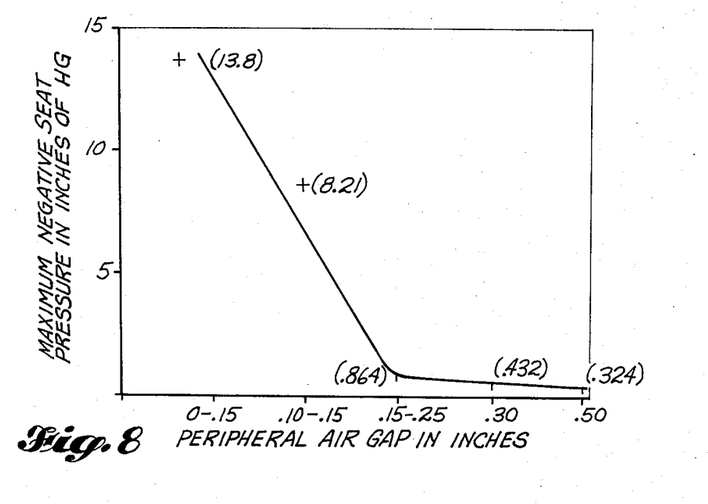
FIG. 8 is a graphic plot of the amount of air space required vs. the suction pressure that could be applied to a person if there were insufficient venting of the toilet bowl.
Figure 9:
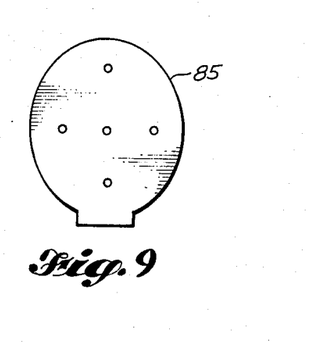
FIG. 9 depicts a toilet seat lid with the location, in circles, of five pickup probes that were utilized for negative pressure tests.

FIGS. 8 and 9 relate to the tests that were conducted to establish the sizing of the toilet bowl air vents 90 or the peripheral air gap required between the toilet bowl 87 and the shroud to prevent any dangerous suction from forming if the toilet is flushed with a person sitting on it. FIG. 9 shows a plastic toilet seat lid 85 that was constructed for the negative pressure tests with five pickup probes inserted as follows: four of the probe pickups were located one inch inside of the toilet bowl rim; and the fifth probe pickup was located in the center of the seat lid. The initial tests indicated that the readings were approximately the same at all locations; therefore, subsequent test readings were taken from the center probe pickup only. Tests were conducted with varied, predetermined air gaps between the lid and the toilet bowl rim. However, because the rim of the toilet bowl was uneven, the air gap was measured with its maximum and minimum dimensions for each of the tests run. The tests were run dry with no waste. The test results established that a vent of a half-inch gap around the top of the toilet bowl will provide completely safe conditions; and that this amount of gap should therefore be used for design purposes. It should be noted that this air gap or vacuum break must be an integral part of the toilet fixture because of the possibility of a person sitting directly onto the toilet bowl without the use of the seat.

For servicing an airplane equipped with this invention, referring to FIG. 3, the procedure is to remove the drain plug 57 and drain out the waste matter from the storage tank 40. When the storage tank 40 is drained, the waste matter sludge is removed from tank compartment 40A; and as it is removed, the relatively clean filtered fluid in tank compartment 40B flows back through the fine mesh screen of the filter 55 and in so doing, back-flushes the filter 55 and washes it clean.

For back-flushing, the check valves 64, 65 can be overridden by pulling on lever 102 interconnected thereto by control cable line 103, to allow backflow and the accumulator tank 58 is emptied; thereby supplying additional pressurized fluid for cleaning the filter 55. Alternatively, the fluid in the pressure lines 44, 45, 46 and the accumulator tank 58 could be left in; and in that way, the system would remain primed for operation.

If necessary, it would be satisfactory to just remove the drain plug 57 and remove the sludge accumulated within tank compartment 40A and then reinsert it and fly again; because enough initial liquid would be retained in the accumulator tank 58 to recycle the system.

But in time, because the liquid gets little by little more contaminated, it is desirable at certain intervals to also drain the pressure side of the system, including the accumulator tank 58. This is accomplished by actuating the check valves 64, 65 by pull lever 102 through the control cable 103, so that the check valves 64, 65 are overridden; thereby, permitting the fluid in lines 44, 45, 46 in the pressure side of the system, to flow back through the pumps 62, 63 into the interconnecting lines 60, 61 to the storage tank 40 where it back-flushes the filter 55 and goes out through the drain emptying into the tank (not shown). Also, the lines 44, 45, 46 of the pressure side of the system can be drained out by opening the pressure drain valve 104.

After this has been done, it will be necessary to fill and recharge the system. This is accomplished by injecting clean liquid from the servicing vehicle through the fill tube 105 or connection 106 on the pressure drain valve 104. The fill tube 105, as shown, does not go through the waste receiving compartment 40A; but is routed around the tank to enter at the top and the fill tube exit is positioned such that the liquid ejected therefrom impinges along the filter 55 to wash it clean as the storage tank 40 is filled. To fill up the storage tank 40 through connection 106 on the pressure drain valve 104, the check valves 64, 65 are opened through actuation of pull lever 102 and control cable 103 and the clean liquid is caused to flow into and back through the pumps 62, 63 into the storage tank 40 via lines 60, 61. The pressure side of the system line 44 is primed and recharged by closing of check valves 64, 65 and drain valve 104, and then starting the pumps 62, 63 until the accumulator tank 58 is filled with the clean liquid.

A storage tank fill quantity gage 108 is connected to a capacitance sensor 107 that is imbedded within the glass fiber wound construction of the tank wall in order that it does not come in contact with the waste. The capacitance sensor element 107 comprises a strip or a belt of electrically conductive material and by building it into the tank wall, there is less chance of it becoming contaminated by the waste.

The required storage capacity of the waste tank 40 is determined by the frequency of servicing. For a typical Boeing 747 airplane with daily servicing of the system, ample tank capacity would be approximately 200 gallons.

We claim:

1. A vacuum flush waste disposal system for an aircraft having a pressurized passenger compartment, said system comprising: a receptacle mounted within the pressurized passenger compartment for receiving waste; said receptacle having an outlet from which the waste is to be extracted; a tank for holding the waste; a first valve means connected to said receptacle outlet; a waste conduit interconnecting said tank with said first valve means; a recovery system contained within the tank for producing filtered liquid; a liquid pressure pump connected to the tank for withdrawing and pressurizing the filtered liquid; spray means mounted within the upper portion of the receptacle for cleaning the inner surface thereof; a second valve means operatively connected to said spray means for controlling the flow of liquid therefrom; a flush fluid conduit connecting the liquid pressure pump with said second valve means; means for venting the tank to ambient air pressure so as to induce a pressure differential between the tank and said first valve means, above a predetermined altitude; an air suction pump connected to the tank for producing a predetermined vacuum pressure in the tank when the aircraft is below said predetermined altitude; manually actuated means having an automatic cycle of operation; connected to both said first and second valve means, for automatically opening and then closing each of said valve means after a predetermined interval of time; thereby releasing pressurized filtered liquid through the spray means, into the receptacle and subjecting the receptacle outlet to a suction pressure corresponding to the predetermined minimum differential between the tank and the pressurized passenger compartment for removal of the waste from the receptacle and for flowing the received waste through said conduit into the waste holding tank; and said receptacle incorporating suction-break means for preventing the application of a suction force to an occupant.

2. The vacuum flush waste disposal system as set forth in claim 1, wherein: said suction-break means comprises air vents in the upper portion of said receptacle for admitting air to the interior of the receptacle at a location other than the normal waste receiving opening, in order to prevent the possibility of injury to the user, by the vacuum force applied during the flushing cycle, in the event that the user sits down in direct contact with the receptacle, with a normally used seat in an up position, and sealingly engages the top peripheral edge of the receptacle.

3. The vacuum flush waste disposal system as set forth in claim 1 further comprising: an overflow sensor mounted to the receptacle and connected to the manually actuated means for automatically actuating said first valve means to prevent overflow of the receptacle.

4. The vacuum flush waste disposal system as set forth in claim 1 wherein: the bottom surface of said tank slopes to a low point from which a constant fluid pick-up is provided for the liquid pressure pump during in-flight attitude changes of the aircraft.

5. The vacuum waste disposal flush system as set forth in claim 1 wherein said recovery system comprises: a screen filter positioned within said tank so as to divide said tank into a waste receiving compartment and a filtered liquid compartment for providing flushing fluid.

6. The vacuum waste disposal flush system as set forth in claim 5, wherein: the filtered liquid is withdrawn from the tank through outlets located in the bottom thereof and recirculated to the waste receivng compartment for continuously removing sediments and thereby preventing solids from building up such as paper mache from tiny pulp particles and clogging the system.

7. The vacuum flush waste disposal system as set forth in claim 5 wherein: a filter cake is formed by the accumulated entrapment of paper particles by the screen filter for producing a finer particle filtration of the withdrawn liquid as the size of the filter cake is increased.

8. The vacuum flush waste disposal system as set forth in claim 5 further comprising: a deflector mounted adjacent to the waste conduit opening into the waste receiving compartment of the tank for directing the incoming waste against the filter to wash along the screen and aid in keeping it from clogging up.

9. The vacuum flush waste disposal system as set forth in claim 5 wherein: said tank is mounted within the fuselage of the aircraft such that the waste receiving compartment and the filtered liquid compartment are aligned longitudinally with respect to the fuselage of the aircraft; and said screen filter is positioned, in said tank, transversely between said longitudinally aligned waste receiving compartment and filtered liquid compartment.

10. The vacuum flush waste disposal system as set forth in claim 9 wherein: said waste receiving compartment and said filtered liquid compartment are arranged such that the liquid contained in the waste receiving compartment is caused to seep through the screen filter due to the liquid head created by the angle of inclination of the tank when the aircraft is at a relatively high angle-of-attack as at take-off and during climb-out.

11. A vacuum powered toilet flush system for an aircraft having a pressurized passenger compartment, said system comprising: a tank centrally located within the fuselage of the aircraft and positioned outside of the pressurized passenger compartment, for holding waste; a recovery system contained within the tank for producing filtered flushing fluid; a pressure system and a storage system interconnected to the tank for recovering and storing the filtered flushing fluid under pressure; means for venting the tank to ambient air, for providing vacuum thereto above a predetermined altitude; a vacuum blower connected to the tank for producing a predetermined vacuum pressure in the tank when the aircraft is below said predetermined altitude; a toilet bowl mounted within the pressurized passenger compartment for receiving waste; said toilet bowl having an outlet in the bottom thereof from which waste is to be extracted; a first valve means connected to said toilet bowl outlet; a waste line interconnecting said tank with said first valve means; a toilet bowl spray ring mounted within the upper portion of the toilet bowl for cleaning the inner surface thereof; a second valve means operatively connected to said spray ring; a flush fluid line connecting the pressurized flush fluid storage system with said second valve means; actuator means connected to the first and second valve means; a toilet flush trip handle and timer mechanism operatively connected to said actuator means for controlling the actuation cycle of said first and second valve means for the admittance of flush fluid through the spray ring and vacuum pressure removal of waste from the toilet bowl to the waste holding tank; and said toilet bowl incorporating suction-break means for preventing the application of a suction force to an occupant.

12. The vacuum powered toilet flush system as set forth in claim 11, wherein: said suction-break means comprises air vents in the upper portion of said toilet bowl for admitting air to the interior of the toilet bowl at a location other than the normal toilet bowl waste receiving opening, in order to prevent the possibility of injury to the user, by the vacuum force applied during the flushing cycle, in the event that the user sits down in direct contact with the bowl, with a normally used seat in an up position, and sealingly engages the top peripheral edge of the toilet bowl.

13. The vacuum powered toilet flush system as set forth in claim 11 further comprising: an overflow sensor mounted to the toilet bowl and connected to the toilet flush timer for automatically actuating said first valve means to prevent overflow of the toilet bowl.

14. The vacuum powered toilet flush system as set forth in claim 11 further comprising: a sump located in the bottom of the tank for providing a constant fluid pick-up to the pressure system and storage system during in-flight attitude changes of the aircraft.

15. The vacuum powered toilet flush system as set forth in claim 11 wherein said recovery system comprises: a screen filter positioned within said tank so as to divide said tank into a waste receiving compartment and a filtered liquid compartment for providing flushing fluid.

16. The vacuum powered toilet flush system as set forth in claim 15, wherein: the filtered flushing fluid is withdrawn from the tank through outlets located in the bottom thereof and recirculated to the waste receiving compartment for continuously removing sediments and thereby preventing solids from building up, such as paper mache from tiny pulp particles and clogging the system.

17. The vacuum powered toilet flush system as set forth in claim 15 wherein: a filter cake is formed by the accumulated entrapment of paper particles by the screen filter for producing a finer particle filtration of the withdrawn liquid as the size of the filter cake is increased.

18. The vacuum powered toilet flush system as set forth in claim 15 further comprising: a deflector mounted adjacent to the waste line opening into the waste receiving compartment of the tank for directing the incoming waste against the filter to wash along the screen and aid in keeping it from clogging up.

19. The vacuum powered toilet flush system as set forth in claim 15 wherein: said tank is mounted within the fuselage of the aircraft such that the waste receiving compartment and the filtered liquid compartment are aligned longitudinally with respect to the fuselage of the aircraft; and said screen filter is positioned, in said tank, transversely between said longitudinally aligned waste receiving compartment and filtered liquid compartment.

20. The vacuum powered toilet flush system as set forth in claim 19 wherein: said waste receiving compartment and said filtered liquid compartment are arranged such that the liquid contained in the waste receiving compartment is caused to seep through the screen filter due to the liquid head created by the angle of inclination of the tank when the aircraft is at a relatively high angle-of-attack as at take-off and during climb-out.

21. A vacuum powered toilet flush system for an aircraft having a pressurized passenger compartment, said system comprising: a toilet bowl mounted within the pressurized passenger compartment for receiving waste; said toilet bowl having an outlet from which the waste is to be extracted; a tank for holding the waste; a filter positioned with the tank so as to divide the tank into a waste receiving compartment and a filtered liquid compartment; a waste conduit interconnecting the outlet of the toilet bowl with the waste receiving compartment of the tank; means for venting the tank to ambient air pressure so as to induce a pressure differential between the tank and the toilet bowl outlet in the pressurized passenger compartment above a predetermined altitude; a vacuum pump connected to the tank and operated in response to ambient air pressure below a predetermined altitude for producing a predetermined minimum pressure differential between the tank and the toilet bowl; a liquid pressure pump connected to the filtered liquid compartment of the tank for withdrawing and pressurizing the filtered liquid; a spray ring mounted within the upper portion of the toilet bowl and connected to the liquid pressure pump for ejecting the pressurized filtered liquid against the inner surface of the toilet bowl to cleanse it; a spray ring valve connected to the spray ring for controlling the flow of liquid from the toilet spray ring; a toilet bowl outlet valve connected to the toilet bowl outlet and normally retained in a closed position until opened to evacuate the toilet bowl; manually actuated means having an automatic cycle of operation, connected to both the spray ring valve and the toilet bowl outlet valve, for automatically opening and then closing each of said valves after a predetermined interval of time; thereby releasing the pressurized filtered liquid into the toilet bowl and subjecting the waste matter to a pressure differential corresponding to the predetermined minimum pressure differential between the tank and the pressurized passenger compartment for flowing the waste thrugh conduits into the waste receiving compartment of the tank; and said toilet bowl incorporating suction-break means for preventing the application of a suction force to an occupant.

22. The vacuum powered toilet flush system as set forth in claim 21, wherein: said suction-break means comprises air vents in the upper portion of said toilet bowl for admitting air to the interior of the toilet bowl at a location other than the normal toilet bowl waste receiving opening, in order to prevent the possibility of injury to the user, by the vacuum force applied during the flushing cycle, in the event that the user sits down in direct contact with the bowl, with a normally used seat in an up position, and sealingly engages the top peripheral edge of the toilet bowl.

23. The vacuum powered toilet flush system as set forth in claim 21 further comprising: an overflow sensor mounted to the toilet bowl and connected to the manually actuated means for automatically actuating the toilet bowl outlet valve to prevent overflow of the toilet bowl.

24. The vacuum powered toilet flush system as set forth in claim 21 further comprising: a sump located in the bottom of the waste receiving compartment of the tank for providing a constant fluid pick-up to the liquid pressure pump during in-flight attitude changes of the aircraft.

25. The vacuum powered toilet flush system as set forth in claim 21 wherein: flushing fluid is withdrawn from the filtered liquid compartment through outlets located in the bottom thereof and recirculated to the waste receiving compartment for continuously removing sediments and thereby preventing solids from building up, such as paper mache from tiny pulp particles and clogging the system.

26. The vacuum powered toilet flush system as set forth in claim 21 wherein: said filter screen provides a matrix for the accumulated entrapment of paper particles to form a filter cake for producing a finer particle filtration of the withdrawn liquid as the size of the filter cake is increased.

27. The vacuum powered toilet flush system as set forth in claim 21 further comprising: a deflector mounted adjacent to the waste conduit opening into the waste receiving compartment of the tank for directing the incoming waste against the filter to wash along the screen and aid in keeping it from clogging up.

28. The vacuum powered toilet flush system as set forth in claim 21 wherein: said tank is mounted within the fuselage of the aircraft such that the waste receiving compartment and the filtered liquid compartment are aligned longitudinally with respect to the fuselage of the aircraft; and said screen filter is positioned, in said tank, transversely between said longitudinally aligned waste receiving compartment and filtered liquid compartment.

29. The vacuum powered toilet flush system as set forth in claim 28 wherein: said waste receiving compartment and said filtered liquid compartment are arranged such that the liquid contained in the waste receiving compartment is caused to seep through the screen filter due to the liquid head created by the angle of inclination of the the tank when the aircraft is at a relatively high angle-of-attack as at take-off and during climb-down.

* * * * *